(12) United States Patent
Kawaoka et al.

(10) Patent No.: US 9,024,940 B2
(45) Date of Patent: May 5, 2015

(54) THREE-DIMENSIONAL IMAGE DISPLAY DEVICE AND THREE-DIMENSIONAL IMAGE DISPLAY METHOD AND PROGRAM

(75) Inventors: Yoshiki Kawaoka, Tokyo (JP); Koichi Yahagi, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 126 days.

(21) Appl. No.: 13/273,400

(22) Filed: Oct. 14, 2011

(65) Prior Publication Data

US 2012/0098829 A1 Apr. 26, 2012

(30) Foreign Application Priority Data

Oct. 26, 2010 (JP) ................................. 2010-239792

(51) Int. Cl.
*G06T 15/00* (2011.01)
*G06T 15/20* (2011.01)
*H04N 13/00* (2006.01)

(52) U.S. Cl.
CPC .......... *G06T 15/205* (2013.01); *H04N 13/0022* (2013.01); *H04N 2213/002* (2013.01)

(58) Field of Classification Search
None
See application file for complete search history.

(56) References Cited

U.S. PATENT DOCUMENTS

| | | | |
|---|---|---|---|
| 7,411,632 B2 | 8/2008 | Isono | |
| 7,724,312 B2 | 5/2010 | Isono | |
| 8,902,043 B1* | 12/2014 | Ackerman et al. | 340/5.8 |
| 2002/0055088 A1* | 5/2002 | Feig | 434/185 |
| 2003/0007204 A1* | 1/2003 | Ashizaki et al. | 359/23 |
| 2004/0032980 A1* | 2/2004 | Harman | 382/154 |
| 2004/0208357 A1* | 10/2004 | Tokuhashi et al. | 382/154 |
| 2005/0089212 A1* | 4/2005 | Mashitani et al. | 382/154 |
| 2006/0001784 A1 | 1/2006 | Isono | |
| 2006/0103664 A1* | 5/2006 | Nakanishi | 345/619 |
| 2006/0126919 A1* | 6/2006 | Kitaura et al. | 382/154 |
| 2009/0015581 A1* | 1/2009 | Hirohara | 345/419 |
| 2009/0103833 A1 | 4/2009 | Mitsuhashi et al. | |
| 2009/0195642 A1* | 8/2009 | Fukushima et al. | 348/51 |
| 2009/0244269 A1 | 10/2009 | Watanabe et al. | |

(Continued)

FOREIGN PATENT DOCUMENTS

| | | |
|---|---|---|
| JP | 08-317429 | 11/1996 |
| JP | 2001-359122 | 12/2001 |

(Continued)

OTHER PUBLICATIONS

JP Office Action dated Sep. 18, 2012, with English translation; Application No. 2010-239792.

*Primary Examiner* — James A Thompson
*Assistant Examiner* — Xilin Guo
(74) *Attorney, Agent, or Firm* — Young & Thompson

(57) ABSTRACT

A three-dimensional (3D) image display device enables easy recognition of a 3D image by appropriately changing the popout amount of a 3D image. The display device includes a timer setting and measuring a given time over which the popout amount of a 3D image changes, a popout amount change mode memory storing information on time dependent change of the popout amount occurring over the given time, a popout amount controller producing the popout amount for each unit time based on parallax between a plurality of images, the given time, and the time dependent change information, a changing image producer producing pairs of popout-amount-changing images from the plurality of images according to a popout amount by the unit time, a 3D image producer producing a corresponding popout-amount-changing 3D image, and a display controller.

11 Claims, 7 Drawing Sheets

(56) References Cited

U.S. PATENT DOCUMENTS

| | | | |
|---|---|---|---|
| 2009/0245584 A1* | 10/2009 | Masuda | 382/106 |
| 2010/0201789 A1* | 8/2010 | Yahagi | 348/51 |
| 2011/0007131 A1* | 1/2011 | Okada et al. | 348/42 |
| 2011/0019989 A1* | 1/2011 | Tanaka | 396/104 |
| 2011/0058019 A1* | 3/2011 | Onozawa | 348/43 |

FOREIGN PATENT DOCUMENTS

| | | |
|---|---|---|
| JP | 2003-209858 | 7/2003 |
| JP | 2006-047996 | 2/2006 |
| JP | 2008-005203 | 1/2008 |
| JP | 2009-239389 | 10/2009 |
| JP | 2010-199739 | 9/2010 |
| JP | 2010-199740 | 9/2010 |

* cited by examiner

FIG. 6
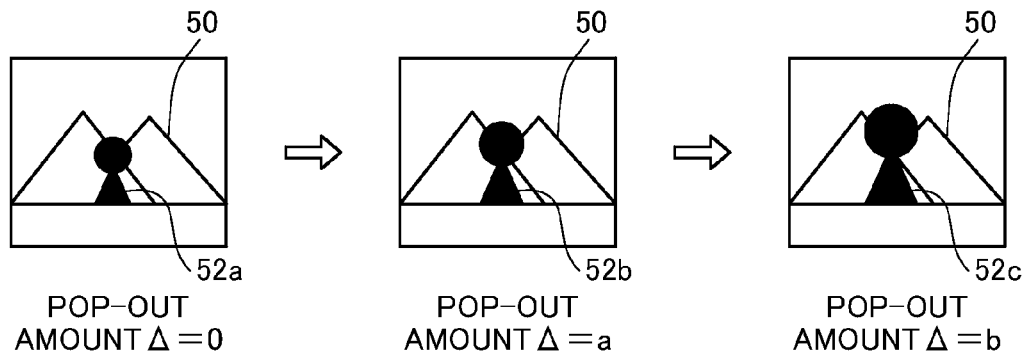
FIG. 7
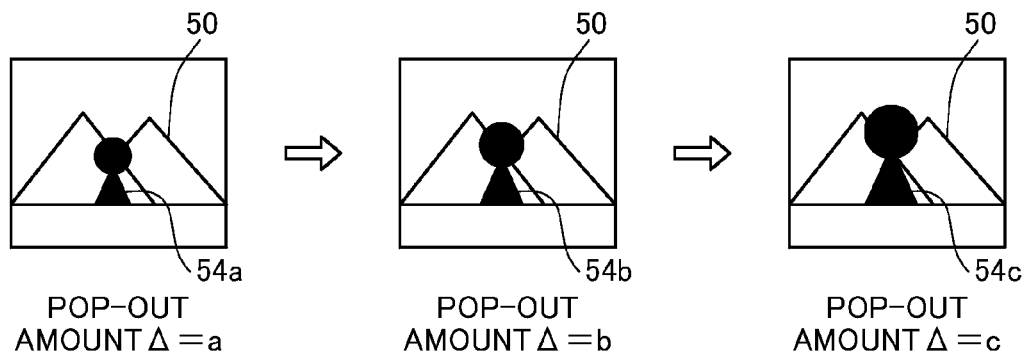
FIG. 8
| IMAGING MODE INFORMATION | MACRO 🌷 | LANDSCAPE ⟨M⟩ | SPORT | PERSON |
|---|---|---|---|---|
| TIME-DEPENDENT CHANGAE INFORMATION | ④ | ③ | ② | ① |

82  80a 80b  82

82  84a 84b  82

THREE-DIMENSIONAL IMAGE DISPLAY DEVICE AND THREE-DIMENSIONAL IMAGE DISPLAY METHOD AND PROGRAM

BACKGROUND OF THE INVENTION

The present invention relates to a three-dimensional image display device and a three-dimensional image display method and program for displaying a three-dimensional image enabling depth perception and produced from a plurality of images acquired by imaging a subject from different viewpoints.

Conventionally, a sense of depth is produced using a parallax caused by displaying a plurality of images having different lines of sight. Examples of methods for producing a sense of depth include a method (1) applying linear polarization to the left eye image and the right eye image in directions crossing each other at right angles and using polarized glasses, a method (2) whereby the left eye image and the right eye image are displayed alternately and viewed with glasses equipped with liquid crystal shutters synchronized with the display means, and a method (3) using red and blue light that are superposed on the left eye image and the right eye image, respectively, and glasses having red and blue color filters on the left and the right piece of glass.

Another method of producing a sense of depth to the naked eye is one whereby, for example, an image is cut into a plurality of strips and arranged alternately for the left and the right eye to view their respective images using a parallax barrier or a lenticular lens to enable depth perception.

As related to the present invention may be cited prior art literature JP 2009-239389 A and JP 2008-5203 A.

JP 2009-239389 A describes displaying a three-dimensional image in such a manner as to lessen a feeling of fatigue felt by the viewer in a case where a subject is imaged from different viewpoints to produce a plurality of images, from which those enabling depth perception are displayed, wherein complementary images having a smaller parallax than the parallax between the plurality of images are produced to gradually change the parallax of the three-dimensional images.

To solve a problem that the viewer is fatigued by a frequent change between a 2D and a 3D image, JP 2008-5203 A describes a display method wherein a 2D image is converted into a new 3D image or a 3D image is converted into a new 2D image, and these converted images are used when a change is made between 2D and 3D images to allow the change to take place gradually.

SUMMARY OF THE INVENTION

Three-dimensional moving images can relatively easily produce a sense of depth to the viewer because of the motion, but three-dimensional still images, when viewed individually, cannot effectively cause the viewer to perceive depth as compared with three-dimensional moving images. Particularly when depth perception is to be achieved with the naked eye, i.e., without the aid of, for example, polarized glasses, depth is yet more difficult to be perceived by the viewer.

In addition, when a planar image is displayed full-screen on a monitor and when the parallax between a plurality of images for displaying a three-dimensional image is great, the area enabling depth perception decreases as illustrated in FIG. 12B, and, as compared with a case where the parallax is small as illustrated in FIG. 12A, the displayed area grows smaller, which may cause a discomfort to the viewer.

Thus, an object of the present invention is to provide a three-dimensional image display device and a three-dimensional image display method and program capable of easily displaying a three-dimensional image by changing the pop-out amount thereof in an appropriate manner so that the viewer can readily perceive depth in the three-dimensional image and capable of enhancing the perceived depth.

In order to attain the object described above, the present invention provides a three-dimensional image display device for displaying a three-dimensional image enabling depth perception and produced from a plurality of images acquired by imaging a subject from different viewpoints, the three-dimensional image display device comprising:

a timer unit for setting and measuring a given time over which a pop-out amount of the three-dimensional image changes;

a pop-out amount change mode memory for storing information on a time-dependent change of the pop-out amount occurring over the given time;

a pop-out amount controller for producing the pop-out amount for each unit time based on a parallax between the plurality of images, the given time, and the time-dependent change information;

a changing image producer for producing a given number of pairs of pop-out amount changing images from the plurality of images according to a pop-out amount by the unit time;

a three-dimensional image producer for producing a corresponding pop-out amount changing three-dimensional image from the given number of pairs of pop-out amount changing images; and a display controller for displaying the corresponding pop-out amount changing three-dimensional image on a monitor based on the given time measured by the timer unit and the unit time.

Also, it is preferred that the pop-out amount is changed so that a given region in the three-dimensional image is displayed with an enhancement applied to a greater extent than another region except for the given region.

Moreover, it is preferred that the plurality of images are larger than a screen of the monitor, and wherein the pop-out amount changing three-dimensional image is substantially as large as or larger than the screen of the monitor.

Also, it is preferred that the pop-out amount changes from a first predetermined level to at least a second predetermined level over the given time. Moreover it is preferred that the first predetermined level is zero.

Also, it is preferred that the pop-out amount is greater at the second predetermined level than at the first predetermined level.

Moreover, it is preferred that one or more of sound, light, and enhanced display are used to notify that the pop-out amount is at least at a third predetermined level.

Also, it is preferred that the pop-out amount is controlled based on the time-dependent change information that varies according to a kind of content of the plurality of images.

Moreover, it is preferred that the time-dependent change information is included in header information of the plurality of images.

Also, the present invention provides a three-dimensional image display method of displaying a three-dimensional image enabling depth perception and produced from a plurality of images acquired by imaging a subject from different viewpoints, the three-dimensional image display method comprising:

a time measuring step of setting and measuring a given time over which a pop-out amount of the three-dimensional image changes;

an information reading step of reading information on a time-dependent change of the pop-out amount occurring over the given time from a pop-out amount change mode memory;

a pop-out amount controlling step of producing the pop-out amount for each unit time based on a parallax between the plurality of images, the given time, and the time-dependent change information;

a changing image producing step of producing a given number of pairs of pop-out amount changing images from the plurality of images according to a pop-out amount by the unit time;

a three-dimensional image producing step of producing a corresponding pop-out amount changing three-dimensional image from the given number of pairs of pop-out amount changing images; and a display controlling step of displaying the corresponding pop-out amount changing three-dimensional image on a monitor based on the measured time and the unit time.

Also, the present invention provides a non-transitory computer readable recording medium embodied with a program for causing a computer to execute the steps of the three-dimensional image display method described above.

According to the present invention, wherein the pop-out amount of a displayed three-dimensional image is changed as appropriate, the viewer can easily perceive depth in the three-dimensional image. Further, the present invention, wherein the perceived depth of a displayed three-dimensional image can be enhanced, enables display thereof with increased entertaining qualities.

BRIEF DESCRIPTION OF THE DRAWINGS

FIG. 6 is a view for explaining an example of a time-dependent change from a planar image to a three-dimensional image.

FIG. 7 is a view for explaining an example of a time-dependent change from a three-dimensional image having a small pop-out amount to a three-dimensional image having a great pop-out amount.

FIG. 8 is a view for explaining an example of a table showing a relationship between kind of image content and time-dependent change information.

DETAILED DESCRIPTION OF THE INVENTION

The three-dimensional image display device for implementing the three-dimensional image display method of the present invention will be described in detail based on the preferred embodiments shown in the attached drawings.

Figure 1:
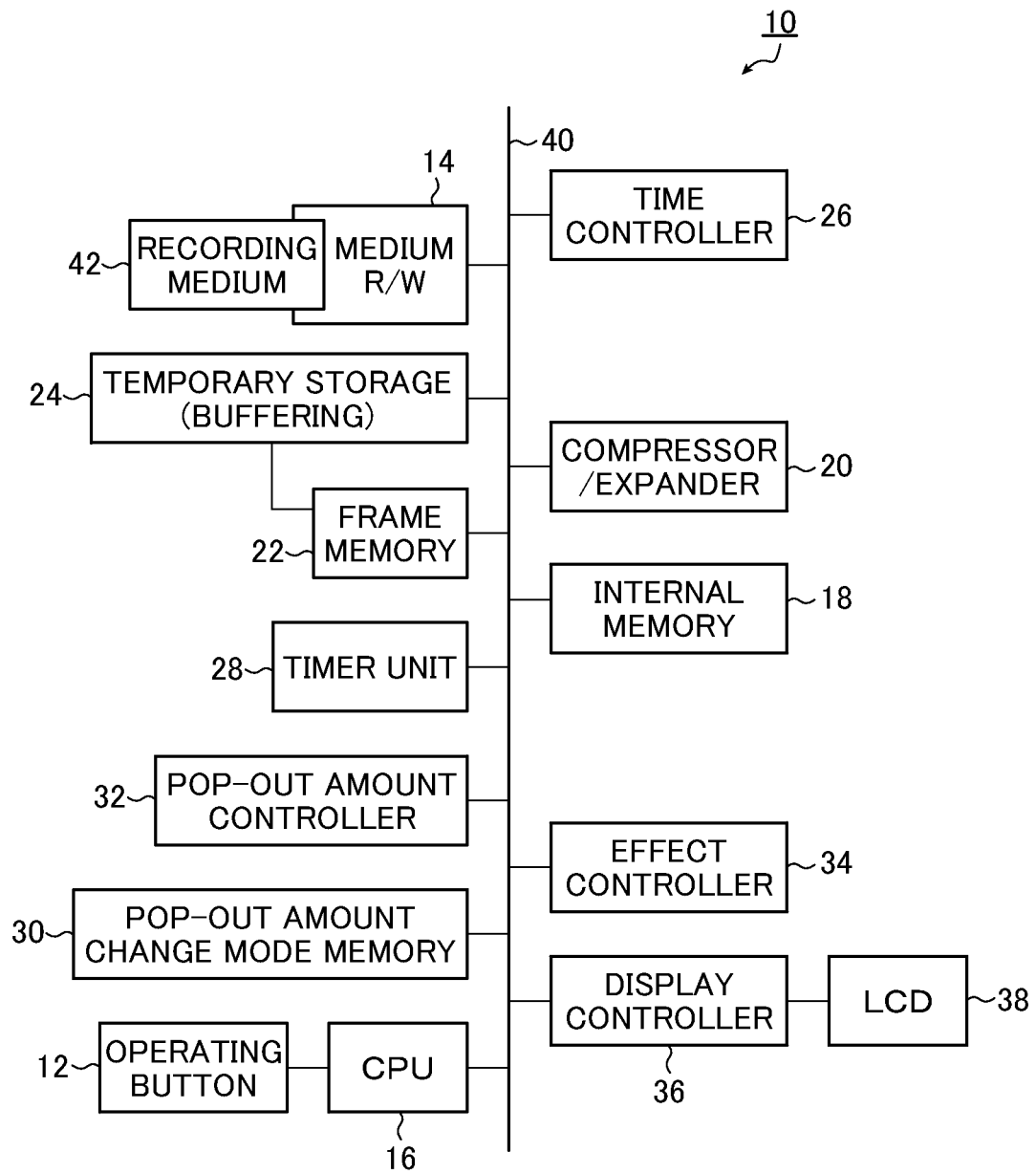
FIG. 1 is a block diagram of a configuration of the three-dimensional image display device according to one embodiment of the present invention.

FIG. 1 is a block diagram illustrating a block diagram illustrating a configuration of the three-dimensional image display device according to one embodiment of the present invention.

The three-dimensional image display device 10 illustrated in FIG. 1 comprises an operating button 12, a medium R/W 14, a CPU 16, an internal memory 18, a compressor/expander 20, a frame memory 22, a temporary storage 24, a time controller 26, a timer unit 28, a pop-out amount change mode memory 30, a pop-out amount controller 32, an effect controller 34, a display controller 36, an LCD 38, and a bus 40. All these except the operating button 12 and the LCD 38 are connected via the bus 40. The medium R/W 14 has a recording medium 42 inserted therein.

The operating button 12 is used by the user to perform various operations of the three-dimensional image display device 10. The operating button 12 may be any known operating equipment including but not limited to a keyboard or a mouse or a touch panel permitting selection of a button displayed on the screen.

The recording medium 42 described later is inserted and connected to the medium R/W 14 to enter therein a pair of images for displaying a three-dimensional image (hereinafter referred to also as 3D image). The entered pair of images are outputted as 2D image data. The pair of images is acquired by imaging a subject from two different imaging points and thus has a parallax according to the difference between the imaging points. The pair of images, acquired from two imaging positions, i.e., from a left-side and a right-side position, is also referred to herein as a left image and a right image, respectively. Although the present invention produces a three-dimensional image from a pair of images according to this embodiment, a three-dimensional image may be produced from three or more images acquired from three or more imaging positions.

Further, the pair of images is not limited to a pair of images acquired as 3D images and may be a pair of images that are still images acquired by the user with a digital still camera or a digital video camera or still images obtained by processing still image data downloaded from a network.

The CPU 16, together with the internal memory 18 described later, constitutes a changing image producer and a three-image producer. The CPU 16 receives information entered with the operating button 12 and controls various components among other functions.

The internal memory 18 is a memory used by the CPU 16 for computation and comprises a DRAM (Dynamic Random Access Memory). In the internal memory 18, various programs are run and computation results are temporarily stored. Part of the internal memory 18 is constituted by a non-volatile memory (e.g., flash memory) to store, for example, programs.

The compressor/expander 20 expands entered 2D image data when it is compressed data and compresses image data when recording it in the recording medium 42. For example, the compressor/expander 20 expands 2D image data compressed into the JPEG (Joint Photographic Experts Group) format to the bit map format or, conversely, compresses bit-map image data into the JPEG format.

The frame memory 22 stores display image (frame image) data and is inputted with pop-out amount changing three-dimensional image data produced by the three-dimensional image producer.

The temporary storage 24 buffers the pop-out amount changing three-dimensional image data stored in the frame memory 22 and temporarily stores frame image data of the pop-out amount changing three-dimensional images repeatedly displayed in the slide show.

The time controller 26 is inputted with the display time of the pop-out amount changing three-dimensional image displayed on the LCD 38 through the operating button 12. The time controller 26 is inputted with, for example, the display time of one pop-out amount changing three-dimensional image in the slide show and the display time of the whole group of a plurality of kinds of pop-out amount changing three-dimensional images. An entered display time is outputted as display time information.

The timer unit 28 sets and measures a time over which the pop-out amount of a pop-out amount changing three-dimensional image is allowed to change. The time over which a pop-out amount is allowed to change (pop-out amount change time: $t_m$) is preferably set to a length of time allowing the viewer to easily perceive depth, say about 1 to 2 seconds. The timer unit 28 outputs the pop-out amount change time $t_m$ and a measured time.

The pop-out amount change mode memory 30 stores time-dependent-change information on the pop-out amount change taking place in the pop-out amount change time $t_m$. The time-dependent pop-out amount change information may be, for example, changes represented by graphs shown in FIGS. 2A to 2D.

Figure 2A:
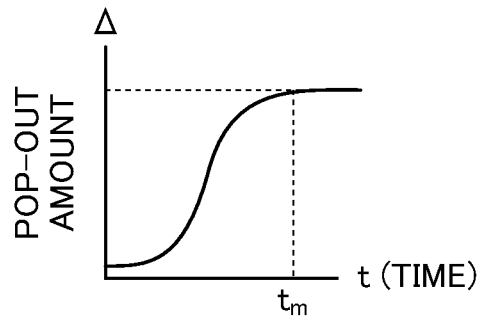
FIGS. 2A to 2D are graphs illustrating examples of time-dependent pop-out amount change information.
Figure 2B:
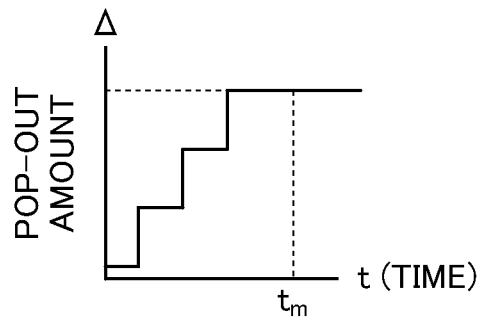
Figure 2C:
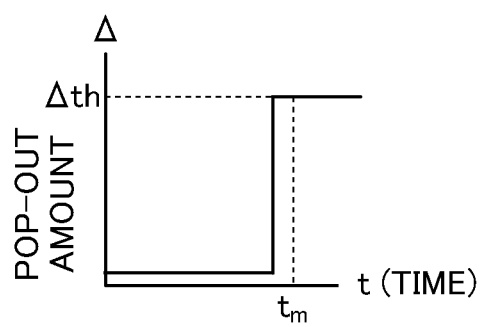
Figure 2D:
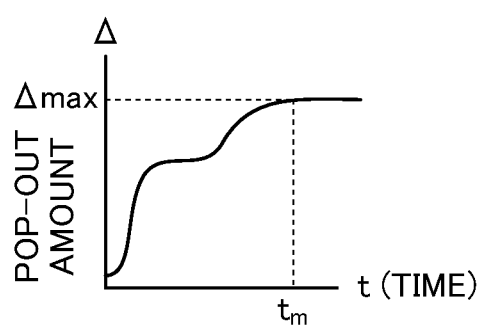

FIG. 2A is a graph showing an exponential increase of a pop-out amount Δ over the pop-out amount change time $t_m$; FIG. 2B is a graph showing a step-wise increase of the pop-out amount Δ over the pop-out amount change time $t_m$. FIG. 2C is a graph showing an acute increase of the pop-out amount Δ to a threshold ($Δ_{th}$ in the drawing) over the pop-out amount change time $t_m$; FIG. 2D is a graph showing the pop-out amount Δ exponentially increasing to about a half of a maximum ($Δ_{max}$ in the drawing), then leveling off before exponentially increasing again to the maximum over the pop-out amount change time $t_m$.

The pop-out amount controller 32 is inputted with 2D image data, the pop-out amount change time $t_m$, and the time-dependent change information. The pop-out amount controller 32 calculates a parallax between a pair of images used when producing a 3D image from 2D image data and produces the pop-out amount Δ by unit time based on the pop-out amount change time $t_m$ and time-dependent change information. In other words, the pop-out amount controller 32 produces the pop-out amount Δ by unit time from graphs showing time-dependent change information as illustrated in FIGS. 2A to 2D and outputs the pop-out amount Δ.

The unit time is set to a value not greater than a value corresponding to a refresh rate of the monitor (LCD 38) so that the viewer does not sense flickers on the screen. With an NTSC monitor, for example, the refresh rate may be set to 60 Hz, and the unit time to 16.7 ms. The monitor may be of any scan mode and resolution as appropriate; it is preferable that the refresh rate is set to 60 Hz or more, the unit time to 16.7 ms or less, while the resolution may be arbitrary. A still higher refresh rate may be used such as, for example, 120 Hz for double speed drive and 240 Hz for quadruple drive as used in a liquid crystal television, when the device used for the monitor is capable of such high refresh rates. The scan mode used may be of progressive mode.

The changing image producer will now be described.

The changing image producer comprises the CPU 16 and the internal memory 18. The changing image producer is inputted with 2D image data and the pop-out amount Δ by unit time. The changing image producer produces pairs of pop-out amount changing images by unit time. When, for example, the unit time is 16.7 ms and the pop-out amount change time $t_m$ is 1 second as in the above example, 60 pairs of pop-out amount changing images are produced.

These pairs of pop-out amount changing images are a plurality of new pairs of images of which the pop-out amount (parallax) Δ between the left image or the right image (pop-out amount Δ=0) of each pair of images and the pair of images constituting a 3D image, where Δ=y, meaning the images are two-dimensional, changes sequentially from 0 to y. Thus, a plurality of pairs of pop-out amount changing images based on which a 3D display is achieved are produced. The pop-out amount Δ may be allowed to grow greater than the pop-out amount of a 3D image produced from original 2D image data.

The three-dimensional image producer will now be described.

The three-dimensional image producer comprises the CPU 16 and the internal memory 18 as does the changing image producer. The three-dimensional image producer is inputted with pairs of pop-out amount changing images, performs conversion in accordance with the display mode, produces a pop-out amount changing three-dimensional image, and outputs the pop-out amount changing three-dimensional image data.

While the display mode depends on the LCD 38, examples thereof include: (1) a parallax type or a lenticular lens type whereby images of pairs of the pop-out amount changing images are arranged alternately by line; (2) a liquid crystal shutter type whereby images of pairs of the pop-out amount changing images are displayed alternately and viewed with glasses equipped with liquid crystal shutters synchronized with the display means; (3) a polarized filter type whereby linear polarization is applied in directions crossing each other at right angles to images of pairs of the pop-out amount changing images, which are then superposed and viewed with polarized glasses; (4) an anaglyph type whereby red and blue light are superposed on images of pairs of the pop-out amount changing images, and the images are superposed and viewed with glasses having a red and a blue color filter provided on the left and the right piece of glass, respectively. Where the viewer does not keep his/her eyes on an image for an extended period of time as in the case of a digital photo frame, the parallax type or the lenticular lens type display mode enabling depth perception for the naked eye is preferred.

The effect controller 34 applies an effect to the pop-out amount changing three-dimensional images when the pop-out amount has reached or exceeded a predetermined level (third predetermined level). Examples of the effect that may be applied include: increasing and decreasing the pop-out amount, generating a sound, lighting an area around the subject where the pop-out amount has reached or exceeded a predetermined level, indicating an area where 3D-effect may be produced, displaying an indication that the 3D-effect changes depending on the direction in which the image is viewed, highlighting an area where 3D-effect is not readily recognized by lighting, applying 3D-effect only to a particular area, and changing the degree of the 3D-effect applied.

Figure 3A:
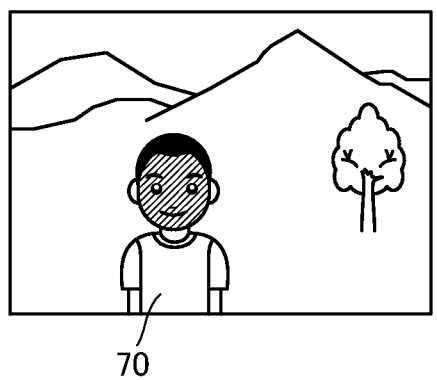
FIGS. 3A and 3B are views for explaining an example of processing for informing that the pop-out amount has exceeded a predetermined level.
Figure 3B:
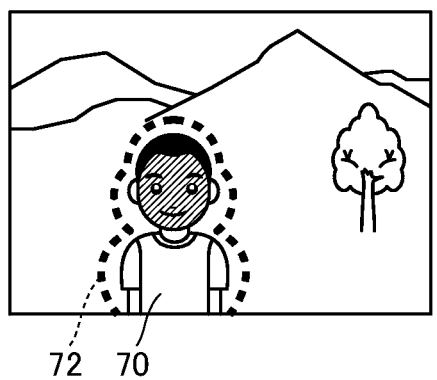
Figure 4A:
FIGS. 4A and 4B are views for explaining another example of processing for informing that the pop-out amount has exceeded a predetermined level.
Figure 4B:
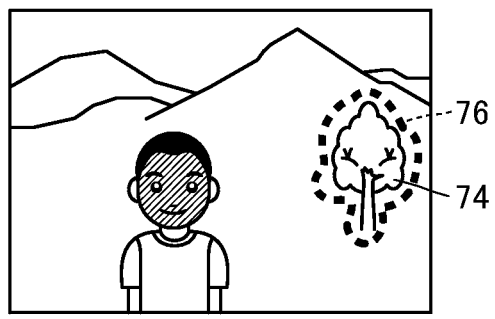

In an example of the effect whereby an area around a subject where the pop-out amount has reached or exceeded a predetermined level is caused to light, when the pop-out amount of a subject 70 as illustrated in FIG. 3A has reached or exceeded a predetermined level, an effect may be applied so that light 72 surrounds the subject 70 as illustrated in FIG. 3B. In an example of the effect whereby an area where 3D-effect may be produced is indicated, the effect may be applied so that a tree 74 illustrated in FIG. 4A is shown with light 76 surrounding the tree 74 as illustrated in FIG. 4B. Thus, even where a 3D-effect is not readily recognized, as in an area close to the edge of the screen, the viewer may be allowed to note that the pop-out amount is at least at a predetermined level.

The display controller 36 is inputted with the measured time, the unit time, and the pop-out amount changing three-dimensional image. Based on the measured time and the unit time, the display controller 36 reads corresponding pop-out amount changing three-dimensional image data from the frame memory 22 and outputs the data to the LCD 38 to display the pop-out amount changing three-dimensional image.

The LCD 38 is a monitor, a liquid crystal display capable of 3D display. The LCD 38 may be a liquid crystal display of, for example, parallax barrier type. The LCD 38 may use another 3D display mode. Where a large display device is used, the LCD 38 is not limited to a liquid crystal display and may be a plasma display or another type of display including a projector, provided that it is capable of 3D display.

Next, the operation of the three-dimensional image display device 10 of the invention for implementing the three-dimensional image display method will be described.

Figure 5:
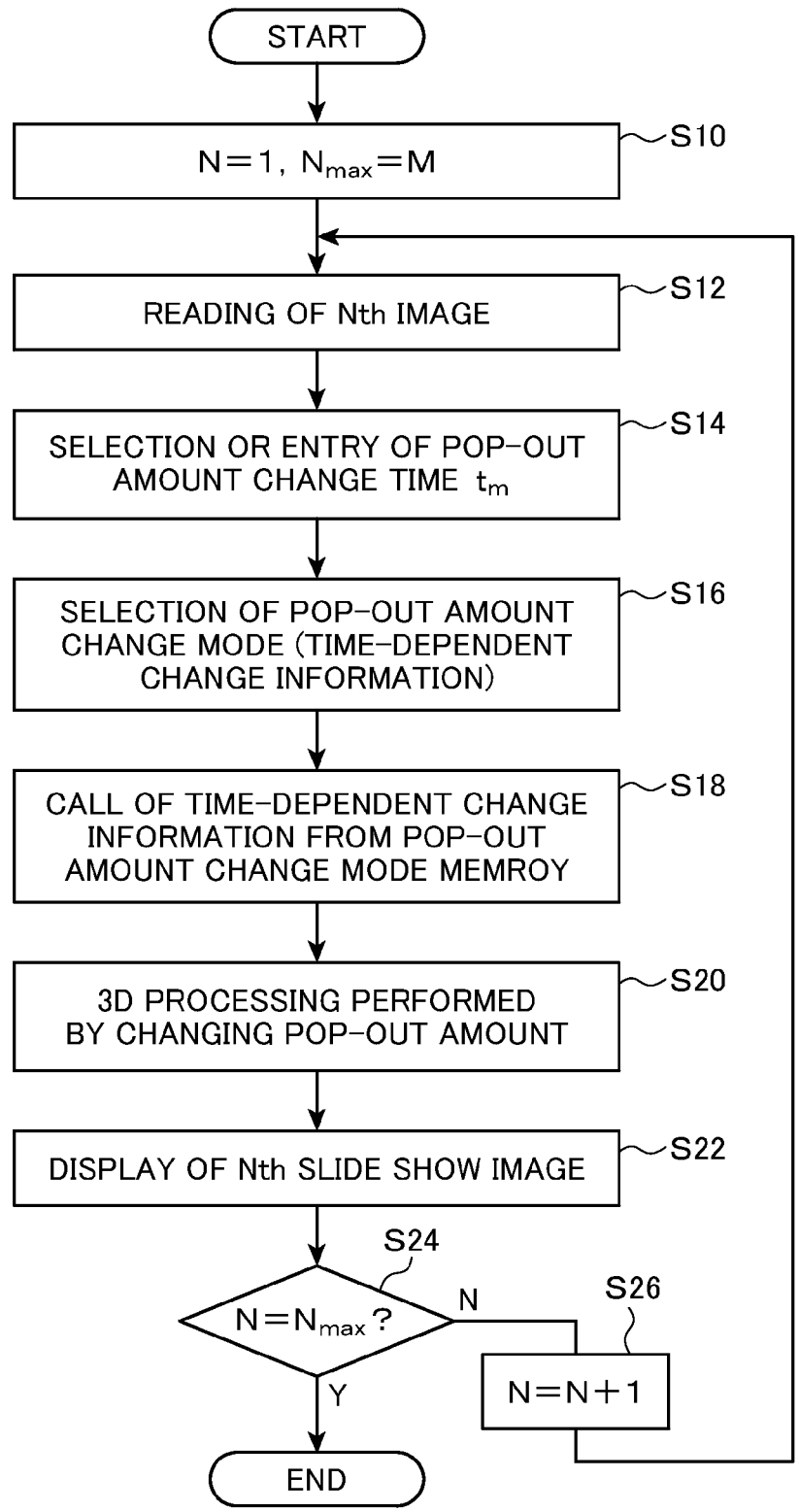
FIG. 5 is a flowchart illustrating an example of flow of operation performed by the three-dimensional image display device of the present invention.

FIG. 5 is a flowchart illustrating an example of flow of operation of the three-dimensional image display method of the present invention.

First, in preparation, the recording medium 42 is provided by a person who installs the three-dimensional image display device 10 (hereinafter referred to as installer) having therein stored image data of a plurality of pairs of images for displaying a 3D image is provided and inserted into the medium R/W 14.

When the three-dimensional image display device 10 is switched on, the number of images of a plurality of pairs of image data stored in the recording medium 42 are counted, and the number of images M is set to $N_{max}$. The counter (count) N is initialized to "1" (step S10).

The installer uses the operating button 12 to enter the pop-out amount changing three-dimensional image display time, which may be, for example, a display time of one pop-out amount changing three-dimensional image in the slide show and a display time of the whole group of the plurality of kinds of pop-out amount changing three-dimensional images i.e., not the complemented pop-out amount changing three-dimensional images but the original images, in the time controller 26, and the display time is outputted as display time information.

The display time of one pop-out amount changing three-dimensional image may be designated directly or obtained from the display time and the number of images of the whole group of images. In lieu of the installer entering the data, preset defaults may be used. For example, the display time of one pop-out amount changing three-dimensional image may be preset to 10 seconds.

Subsequently, a pair of images for a first (Nth) image are read via the medium R/W 14 from the recording medium 42 and outputted as 2D image data (step S12). Now, the 2D image data is entered in the display controller 36, and the left image or the right image of the 2D image data is displayed on the LCD 38 for the installer to check the image.

Next, the installer uses the operating button 12 to select or enter the time for the pop-out amount of the first pop-out amount changing three-dimensional image to reach or exceed a predetermined level, i.e., the pop-out amount change time $t_m$ (step S14). The selected or entered pop-out amount change time $t_m$ is entered in the timer unit 28 and set. The pop-out amount change time $t_m$ may be a preset default, say 2 seconds.

With the pop-out amount change time $t_m$ set, the installer uses the operating button 12 to select a mode in which the pop-out amount is changed, i.e., time-dependent change information (step S16), whereupon corresponding time-dependent change information is read from the pop-out amount change mode memory 30 and entered in the pop-out amount controller 32 and set (step S18). The time-dependent change information of the pop-out amount Δ as illustrated in FIGS. 2A to 2D is selected. A default may be set; time-dependent change information showing a pop-out amount increasing exponentially as illustrated in FIG. 2A, for example, may be set as a default.

With the time-dependent change information set, first 2D image data and the pop-out amount change time $t_m$ are entered in the pop-out amount controller 32. The pop-out amount controller 32 calculates the parallax between the left image and the right image constituting a 3D image from 2D image data, produces the pop-out amount Δ by unit time based on the pop-out amount change time $t_m$ and the time-dependent change information, and outputs the pop-out amount Δ.

The pop-out amount Δ by unit time is entered in the changing image producer, where pairs of pop-out amount changing images by unit time, i.e., a left and a right image constituting each of 3D images for each unit time (a pair of image), are produced and outputted.

The pairs of pop-out amount changing images by unit time are entered in the three-dimensional image producer. The pairs of pop-out amount changing images by unit time undergo conversion according to the display mode of the LCD 38, the pop-out amount changing three-dimensional image by unit time is produced, and all the pop-out amount changing three-dimensional images for the pop-out amount change time $t_m$, i.e., pop-out amount changing three-dimensional image data corresponding to one image is outputted (step S20).

When an effect is applied to the pop-out amount changing three-dimensional image data, the pop-out amount changing three-dimensional image data is entered in the effect controller 34. The effect controller 34 applies an effect to the pop-out amount changing three-dimensional image data and outputs the data with the effect applied. The effects applied by the effect controller 34 include production of sound and lighting of an area around a subject where the pop-out amount has reached or exceeded a predetermined level.

The frame memory 22 temporarily stores pop-out amount changing three-dimensional image data or pop-out amount changing three-dimensional image data to which an effect has been applied. The same data is temporarily buffered in the temporary storage 24. The pop-out amount changing three-dimensional image data of the whole group of images or the pop-out amount changing three-dimensional image data to which an effect has been applied is buffered in the temporary storage 24 and sequentially written back into the frame memory 22 again during the slide show.

The measured time and the unit time outputted from the timer unit 28 are inputted to the display controller 36, whereupon, based on the measured time and the unit time, corresponding pop-out amount changing three-dimensional image data or pop-out amount changing three-dimensional image data to which an effect has been applied is read from the frame memory 22 and sequentially outputted from the LCD 38 as display image data to display the pop-out amount changing three-dimensional image. Thus, one 3D image is displayed as its pop-out amount changes (step S22).

When a first pop-out amount changing three-dimensional image (i.e., display image) is displayed, the count N of the counter is compared with $N_{max}$ (step S24) and, when the count N is smaller than $N_{max}$ ("N" in step S24), N is increased by 1 increment (step S26), whereupon the procedure returns to step S12, where the next one pair of images undergo the same processing. When the count N is equal to $N_{max}$ ("Y" in step S24), the processing ends.

Upon termination of the processing in the flowchart shown in FIG. 5, the temporary storage 24 has the pop-out amount changing three-dimensional image data corresponding to all the 2D image data buffered therein.

Subsequently, the installer uses the operating button 12 to give a slide show start instruction, whereupon corresponding pop-out amount changing three-dimensional image data is read by the display controller 36 based on the measured time and the unit time from the frame memory 22 and sequentially outputted as display image data to the LCD 38 in order to display the pop-out amount changing three-dimensional image.

Now, when Nth pop-out amount changing three-dimensional image data is read from the frame memory 22, (N+1)th (first when $N=N_{max}$) pop-out amount changing three-dimensional image data is written back into the frame memory 22 from the temporary storage 24. Therefore, when the pop-out amount changing three-dimensional image data is read the next time by the display controller 36 from the frame 22, (N+1)th (first, when $N=N_{max}$) pop-out amount changing three-dimensional image data is read. Accordingly, a plurality of three-dimensional images with changing pop-out amount Δ are repeatedly displayed on the LCD 38 in the slide show.

The change in pop-out amount will now be described referring to specific examples.

First, a slide show where the time-dependent change information shown in FIG. 2D is selected will be described referring to FIGS. 6 and 7. In the explanation to follow, the pop-out amount changing three-dimensional image is also referred to simply as 3D image.

FIG. 6 illustrates a change from a state where the pop-out amount Δ=0 (first predetermined level), that is, where the left image or the right image of 2D image data is displayed and, through a state where the pop-out amount Δ=a, to a state where the pop-out amount Δ=b, that is, a 3D image is displayed, a and b being a second predetermined level. When the pop-out amount Δ=0, a background 50 and a person 52a are both planar images, that is, they do not project forward. The pop-out amount Δ increases exponentially according to the graph of FIG. 2D until it temporarily levels off at Δ=a. In other words, the person 52a becomes a 3D image that pops out as a person 52b. The pop-out amount Δ thereafter increases again exponentially before reaching Δ=b. In other words, the person 52b becomes a 3D image that further pops out as a person 52c. In the process, the background 50 remains unchanged in dimensions, making the time-dependent change in pop-out amount the more easier to perceive.

FIG. 7 illustrates a change in pop-out amount Δ from a state where the pop-out amount Δ is small (Δ=a) and, through a state where the pop-out amount Δ=b, to a state where the image is a 3D image with a pop-out amount of Δ=c. Thus, the slide show may start with a display image that is a 3D image having a small pop-out amount Δ in lieu of a planar image, changing into a 3D image having a great pop-out amount L.

Figure 9:
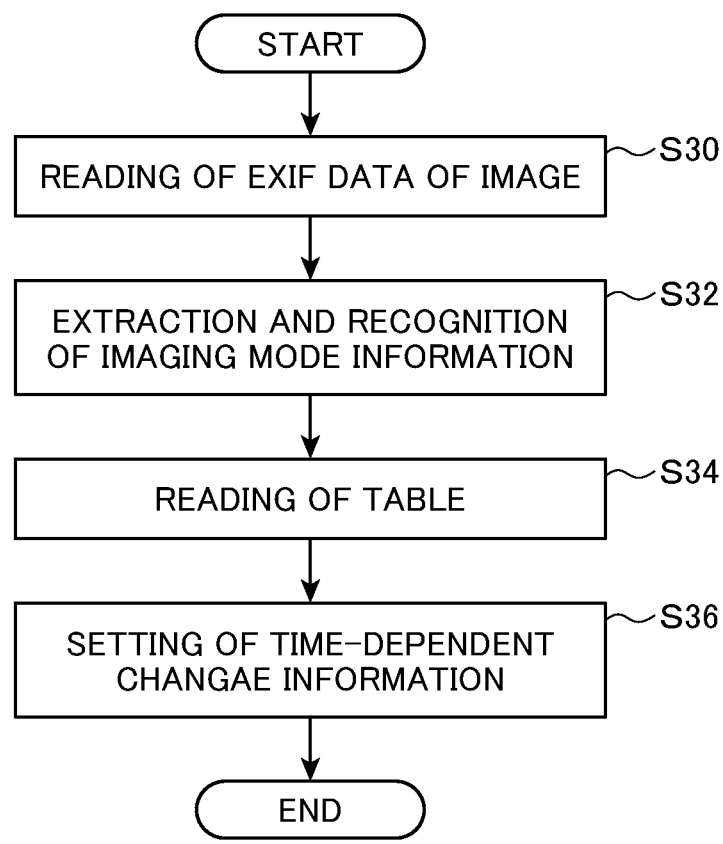
FIG. 9 is a flowchart showing an example of flow of processing for selecting an optimum time-dependent change information from the table.

Next, a selection of time-dependent change information representing an optimum pop-out amount according to the content or imaging mode of a plurality of images (pairs of images) is described referring to FIGS. 8 and 9.

FIG. 8 illustrates an example of a table correlating information on imaging mode used to acquire a pair of images to time-dependent change information.

Image data acquired by, for example, a digital camera often contains header information in the form of Exif (exchangeable image file format). Because Exif data includes imaging mode information, Exif data may be used to automatically select time-dependent change information on a pair of images (2D image data) for a 3D image.

To select time-dependent change information according to the imaging mode, the step S16 in the flowchart shown in FIG. 5 is replaced by the flowchart shown in FIG. 9. Selection of time-dependent change information according to the imaging mode is now described referring to the flowchart shown in FIG. 9.

First, Exif data including information on the imaging mode is read from 2D image data in step S30. The imaging mode information is extracted from the Exif data and noted in step S32, a table stored in, for example, the internal memory 18 is read in step S34, and according to the table, time-dependent change information is set in step S36.

According to the example shown in FIG. 8, when the imaging mode contained in the Exif data is "macro," time-dependent change information No. 4 or time-dependent change information shown in FIG. 2C is selected, so that the image, which is a close-up shot, may be displayed with an enhancement. When the imaging mode is "landscape," time-dependent change information No. 3 or time-dependent change information shown in FIG. 2D is selected, so that the image may be displayed with a gradual change in perceived depth. When the imaging mode contained in the Exif data is "sport," time-dependent change information No. 2 or time-dependent change information shown in FIG. 2B is selected, so that the image may be displayed with an emphasis placed on movement. When the imaging mode is "person," time-dependent change information No. 1 or time-dependent change information shown in FIG. 2A is selected, so that the image may be displayed with a gradual change in perceived depth.

Displaying an image on the LCD 38 will now be described.

Figure 10A:
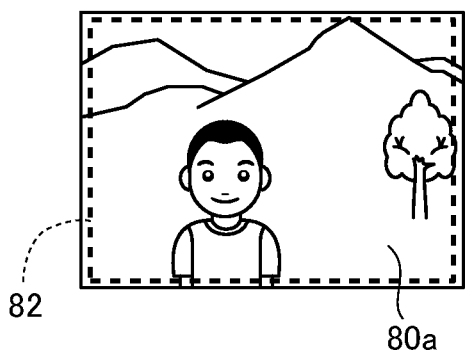
FIGS. 10A and 10B are views for explaining an example where a three-dimensional image is not desirably displayed.
Figure 10B:
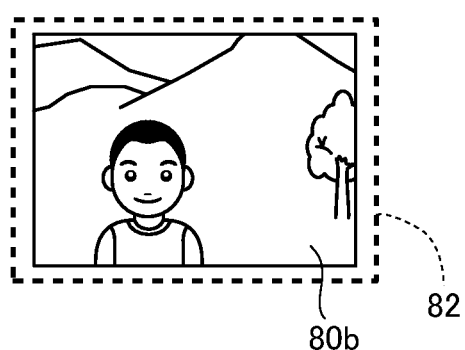

FIG. 10A illustrates a state where the pop-out amount Δ=0, that is, where the left image or the right image of 2D image data (2D image) is displayed on the LCD 38. A 2D image 80a is displayed in substantially the same dimensions as a frame 82 of the LCD 38. Should the pop-out amount Δ having such dimensions be increased until a 3D image 80b is displayed, the area thereof permitting depth perception decreases to a size smaller than the display frame 82. For the 3D image 80b to have substantially the same size as the display frame 82 requires enlargement processing, which, implemented simultaneously as the 2D image 80a changes to the 3D image 80b, could cause discomfort to the viewer. Conversely, should the enlargement processing not be implemented, an area would be produced between the display frame 82 and the 3D image 80b, where depth perception is impossible, impairing the look of the image.

Figure 11A:
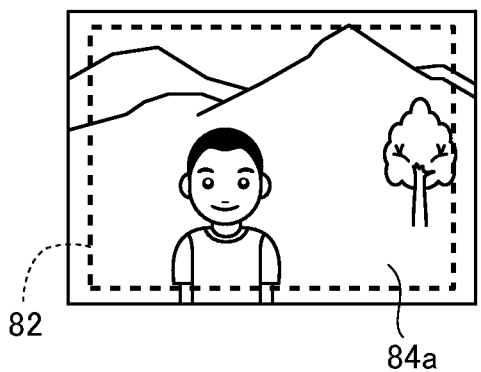
FIGS. 11A and 11B are views for explaining an example where a three-dimensional image is desirably displayed.
Figure 11B:
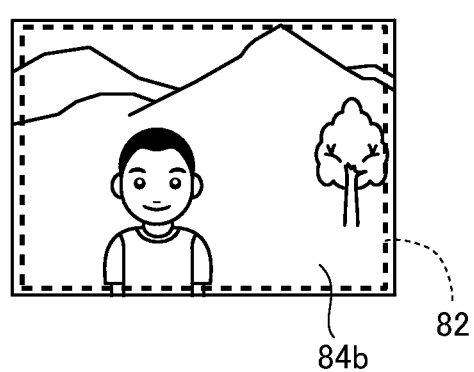
Figure 12A:
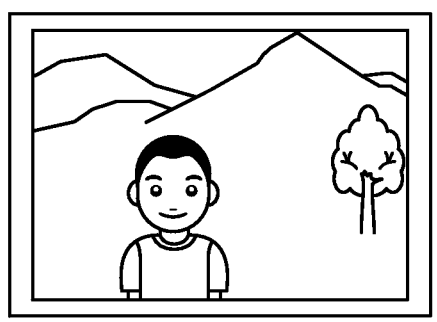
FIGS. 12A and 12B are views for explaining the relationship between a pop-out amount of a three-dimensional image and the resulting display thereof.
Figure 12B:
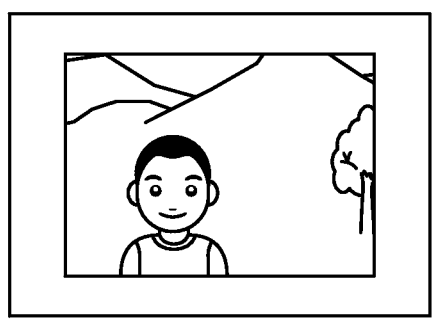

Therefore, as illustrated in FIG. 11A, when a 2D image 84a is displayed so as to be larger than the display frame 82 first, so that part of the 2D image 84a is outside of the display frame 82, increasing the pop-out amount Δ does not cause a 3D image 84b to be smaller than the display frame 82 as illustrated in FIG. 11B. Thus, the area of the image visible to the viewer as defined by the display frame 82 remains unchanged so that the viewer may see the 3D image without feeling discomfort. Moreover, there is produced no area where depth perception is impossible.

The three-dimensional image display device of the present invention, wherein the pop-out amount of a displayed three-dimensional image is changed as appropriate, enables the viewer to easily recognize the three-dimensional image. Further, the three-dimensional image display device of the present invention, wherein the perceived depth of a displayed three-dimensional image can be enhanced, is capable of displaying images with increased entertaining qualities.

Further, according to the present invention, displaying a planar image so as to be larger than the display frame of the monitor first prevents occurrence of an area where depth perception is impossible as the pop-out amount is increased and thus obviates the necessity of enlarging the image as the pop-out amount is increased, thereby allowing the viewer to see the three-dimensional image without feeling discomfort.

Further, because the image is allowed to change gradually, the strain on the viewer's eyes can be lessened.

While a digital photo frame is described by way of example in the above embodiment, the invention is not limited thereto. Where glasses are used to view an image on a large-screen television, for example, the effect such as pop-out amount and other effects may be applied to a degree that may vary depending on the viewer, or a still 3D image stored in a cloud data home server may be viewed.

Further, the time-dependent change information may be included in the header information.

According to the invention, the three-dimensional image display program may be one for causing a computer to execute the steps of the three-dimensional image display method described above or one for causing a computer to function as individual means for executing the steps of the three-dimensional image display method, or a program for causing a computer to function as individual means constituting the above three-dimensional image display device.

Further, according to the present invention, the three-dimensional image display program may be configured as a computer-readable program or a computer-readable memory.

While the three-dimensional image display device and the three-dimensional image display method and program according to the present invention have been described above in detail, the present invention is by no means limited to the foregoing embodiments, and various improvements and modifications may be made without departing from the spirit of the present invention.

What is claimed is:

1. A three-dimensional image display device for displaying a three-dimensional image enabling depth perception and produced from a plurality of images acquired by imaging a subject from different viewpoints, the three-dimensional image display device comprising:
   a timer unit for setting and measuring a given time over which a pop-out amount of the three-dimensional image changes;
   a pop-out amount change mode memory in which information on a time-dependent change of the pop-out amount occurring over the given time is previously stored;
   a pop-out amount controller for producing the pop-out amount for each unit time based on a parallax between the plurality of images, the given time, and the time-dependent change information;
   a changing image producer for producing a given number of pairs of pop-out amount changing images including the pairs of pop-out amount changing images which have a parallax according to a pop-out amount for each unit time from the plurality of images according to a pop-out amount by the unit time;
   a three-dimensional image producer for producing a corresponding pop-out amount changing three-dimensional image from the given number of pairs of pop-out amount changing images;
   an effect controller for applying an effect of enhanced display to the corresponding pop-out amount changing three-dimensional image when the pop-out amount has reached or exceeded a third predetermined level; and
   a display controller for displaying the corresponding pop-out amount changing three-dimensional image or the corresponding pop-out amount changing three-dimensional image to which the effect has been applied on a monitor based on the given time measured by the timer unit and the unit time,
   wherein the effect controller is adapted to cause an area around the subject where the pop-out amount has reached or exceeded the third predetermined level to light.

2. The three-dimensional image display device according to claim 1, wherein the pop-out amount is changed so that a given region in the three-dimensional image is displayed with an enhancement applied to a greater extent than another region except for the given region.

3. The three-dimensional image display device according to claim 1, wherein the plurality of images are larger than a screen of the monitor, and wherein the pop-out amount changing three-dimensional image is substantially as large as or larger than the screen of the monitor.

4. The three-dimensional image display device according to claim 1, wherein the pop-out amount changes from a first predetermined level to at least a second predetermined level over the given time.

5. The three-dimensional image display device according to claim 4, wherein the first predetermined level is zero.

6. The three-dimensional image display device according to claim 4, wherein the pop-out amount is greater at the second predetermined level than at the first predetermined level.

7. A three-dimensional image display method of displaying a three-dimensional image enabling depth perception and produced from a plurality of images acquired by imaging a subject from different viewpoints, the three-dimensional image display method comprising:
   a time measuring step of setting and measuring a given time over which a pop-out amount of the three-dimensional image changes;
   an information reading step of reading information on a time-dependent change of the pop-out amount occurring over the given time from a pop-out amount change mode memory in which the information on the time-dependent change of the pop-out amount is previously stored;
   a pop-out amount controlling step of producing the pop-out amount for each unit time based on a parallax between the plurality of images, the given time, and the time-dependent change information;
   a changing image producing step of producing a given number of pairs of pop-out amount changing images including the pairs of pop-out amount changing images which have a parallax according to a pop-out amount for each unit time from the plurality of images according to a pop-out amount by the unit time;
   a three-dimensional image producing step of producing a corresponding pop-out amount changing three-dimensional image from the given number of pairs of pop-out amount changing images;
   an effect applying step of applying an effect of enhanced display to the corresponding pop-out amount changing three-dimensional image when the pop-out amount has reached or exceeded a third predetermined level; and a display controlling step of displaying the corresponding pop-out amount changing three-dimensional image or the corresponding pop-out amount changing three-dimensional image to which the effect has been applied on a monitor based on the measured time and the unit time, wherein the effect applying step causes an area around the subject where the pop-out amount has reached or exceeded the third predetermined level to light.

8. A non-transitory computer readable recording medium embodied with a program for causing a computer to execute the steps of the three-dimensional image display method described in claim 7.

9. The three-dimensional image display device according to claim 1, wherein the pop-out amount controller is adapted to select time-dependent change information according to a kind of content of the plurality of images from among two or more of time-dependent change information previously stored in the pop-out amount change mode memory and control the pop-out amount based on the selected time-dependent change information.

10. The three-dimensional image display device according to claim 1, wherein the time-dependent change information is included in header information of the plurality of images.

11. The three-dimensional image display device according to claim 9, wherein the kind of content of the plurality of images is imaging mode information which is included in header information of the plurality of images.

\* \* \* \* \*